(12) United States Patent
Shirasaki et al.

(10) Patent No.: US 12,466,199 B2
(45) Date of Patent: Nov. 11, 2025

(54) SHEET TRANSPORT DEVICE INCLUDING TWO TYPES OF CORRUGATION MEMBERS, SHEET POSTPROCESSING APPARATUS, AND SHEET POSTPROCESSING SYSTEM

(71) Applicant: KYOCERA Document Solutions Inc., Osaka (JP)

(72) Inventors: Seiichi Shirasaki, Osaka (JP); Terumitsu Noso, Osaka (JP); Yasunori Ueno, Osaka (JP); Takehiko Okada, Osaka (JP); Keisuke Egawa, Osaka (JP); Yusuke Takano, Osaka (JP); Takuya Nishimura, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 194 days.

(21) Appl. No.: 18/413,771

(22) Filed: Jan. 16, 2024

(65) Prior Publication Data

US 2024/0246344 A1 Jul. 25, 2024

(30) Foreign Application Priority Data

Jan. 24, 2023 (JP) ................................. 2023-008934

(51) Int. Cl.
*B65H 29/52* (2006.01)
*B41J 3/44* (2006.01)
(Continued)

(52) U.S. Cl.
CPC .............. *B41J 3/44* (2013.01); *B65H 29/125* (2013.01); *B65H 29/20* (2013.01); *B65H 29/52* (2013.01);
(Continued)

(58) Field of Classification Search
CPC .......... B41J 3/44; B65H 29/125; B65H 29/20; B65H 29/52; B65H 29/70; B65H 31/02; B65H 2401/15
See application file for complete search history.

(56) References Cited

U.S. PATENT DOCUMENTS

| 8,505,913 | B2 * | 8/2013 | Nishii | ....................... B65H 5/36 271/264 |
| 2004/0251592 | A1 * | 12/2004 | Ruhe | ....................... B41J 13/103 271/121 |

FOREIGN PATENT DOCUMENTS

| JP | 2007062870 A | * | 3/2007 |
| JP | 2010228854 A | * | 10/2010 |
| JP | 2011068445 A | | 4/2011 |

* cited by examiner

*Primary Examiner* — Yaovi M Ameh
(74) *Attorney, Agent, or Firm* — IP Business Solutions, LLC.

(57) ABSTRACT

A sheet transport device includes a delivery roller and a transport route. The transport route includes an upper guide member and a lower guide member. The lower guide member includes a first guide rib, a first corrugation member, and a first elastic member. The first elastic member supports an end portion of the first corrugation member on a side of the delivery roller, such that the end portion protrudes ahead of the first guide rib toward the upper guide member, with respect to the other end portion. The upper guide member includes a second guide rib, a second corrugation member, and a second elastic member. The second elastic member supports an end portion of the second corrugation member on the side of the delivery roller, such that the end portion protrudes ahead of the second guide rib toward the lower guide member, with respect to the other end portion.

12 Claims, 6 Drawing Sheets

(51) Int. Cl.
  *B65H 29/12* (2006.01)
  *B65H 29/20* (2006.01)
  *B65H 29/70* (2006.01)
  *B65H 31/02* (2006.01)
(52) U.S. Cl.
  CPC ............ *B65H 29/70* (2013.01); *B65H 31/02* (2013.01); *B65H 2401/15* (2013.01)

SHEET TRANSPORT DEVICE INCLUDING TWO TYPES OF CORRUGATION MEMBERS, SHEET POSTPROCESSING APPARATUS, AND SHEET POSTPROCESSING SYSTEM

INCORPORATION BY REFERENCE

This application claims priority to Japanese Patent Application No. 2023-008934 filed on Jan. 24, 2023, the entire contents of which are incorporated by reference herein.

BACKGROUND

The present disclosure relates to a sheet transport device that transports a plurality of sheets and delivers the sheets to a tray, a sheet postprocessing apparatus that performs postprocessing on the plurality of sheets stacked on the tray, and a sheet postprocessing system. In particular, the present disclosure relates to a technique to enhance the rigidity of the sheet, before delivering the sheet to the tray.

In an image forming apparatus, an image reading device reads the image of a source document, and an image forming device forms the image of the source document on a recording sheet. The sheet postprocessing apparatus receives the recording sheet, having the document image formed thereon, from the image forming apparatus, and performs postprocessing on the recording sheet. The postprocessing performed by the sheet postprocessing apparatus includes, for example, a stapling operation including placing a plurality of recording sheets on a tray, aligning the edges of the recording sheets, and binding the aligned edges of the recording sheets. To perform the stapling operation, it is necessary to quickly place the recording sheets on the tray, and prevent the recording sheets from positionally shifting from each other.

A known delivery roller unit includes a drive shaft provided at a terminal section of a transport route, through which the recording sheet is transported, and a plurality of drive rollers are fixed to the drive shaft with a spacing between each other. Between the drive rollers, corrugation ribs are provided that are supported by an elastic mounting base, so that the protruding height of the corrugation ribs can vary, and the corrugation ribs are pressed against the recording sheet from above, so that the recording sheet is formed into a corrugated shape, and thus the rigidity of the recording sheet is enhanced.

In addition, a sheet delivery device is known that includes a delivery roller and a follower roller for pinching the sheet therebetween, and transporting and delivering the sheet to a tray, by the rotation of the delivery roller. In such a sheet delivery device, a corrugation member is supported so as to swing toward and away from the drive shaft of the roller. The corrugation member is made to swing so as to contact the sheet from above, to enhance the rigidity of the sheet, by forming the sheet into the corrugated shape.

SUMMARY

The disclosure proposes further improvement of the foregoing techniques.

In an aspect, the disclosure provides a sheet transport device including a delivery roller and a transport route. The delivery roller delivers a sheet. The transport route is provided upstream of the delivery roller in a delivery direction of the sheet, and includes an upper guide member and a lower guide member opposed to each other, and configured to guide the sheet toward the delivery roller. The lower guide member includes a plurality of first guide ribs, a first corrugation member, and a first elastic member. The first guide ribs are aligned on a surface of the lower guide member in a width direction orthogonal to the delivery direction, and each extend in the delivery direction, to support the sheet. The first corrugation member is a belt-like, thin plate-shaped member extending in the delivery direction along the first guide rib. The first elastic member supports an end portion of the first corrugation member, on a side of the delivery roller in the delivery direction, such that the end portion protrudes ahead of the first guide rib toward the upper guide member, with respect to the other end portion. The upper guide member includes a plurality of second guide ribs, a second corrugation member, and a second elastic member. The second guide ribs are aligned on a surface of the upper guide member in the width direction orthogonal to the delivery direction, and each extend in the delivery direction, to support the sheet. The second corrugation member is a belt-like, thin plate-shaped member extending in the delivery direction of the sheet, along the second guide rib. The second elastic member supports an end portion of the second corrugation member, on the side of the delivery roller in the delivery direction, such that the end portion protrudes ahead of the second guide rib toward the lower guide member, with respect to the other end portion.

In another aspect, the disclosure provides a sheet postprocessing apparatus including the foregoing sheet transport device, and a postprocessing device. The postprocessing device performs postprocessing on the sheet delivered through the delivery roller of the sheet transport device.

In still another aspect, the disclosure provides a sheet postprocessing system including an image forming apparatus, and the foregoing sheet postprocessing apparatus. The image forming apparatus includes an image forming device that forms an image on the sheet. The transport rout of the sheet transport device guides the sheet received from the image forming apparatus, to the delivery roller of the sheet transport device.

DETAILED DESCRIPTION

Hereafter, a sheet transport device, a sheet postprocessing apparatus, and a sheet postprocessing system according to an embodiment of the disclosure will be described, with reference to the drawings.

Figure 1:
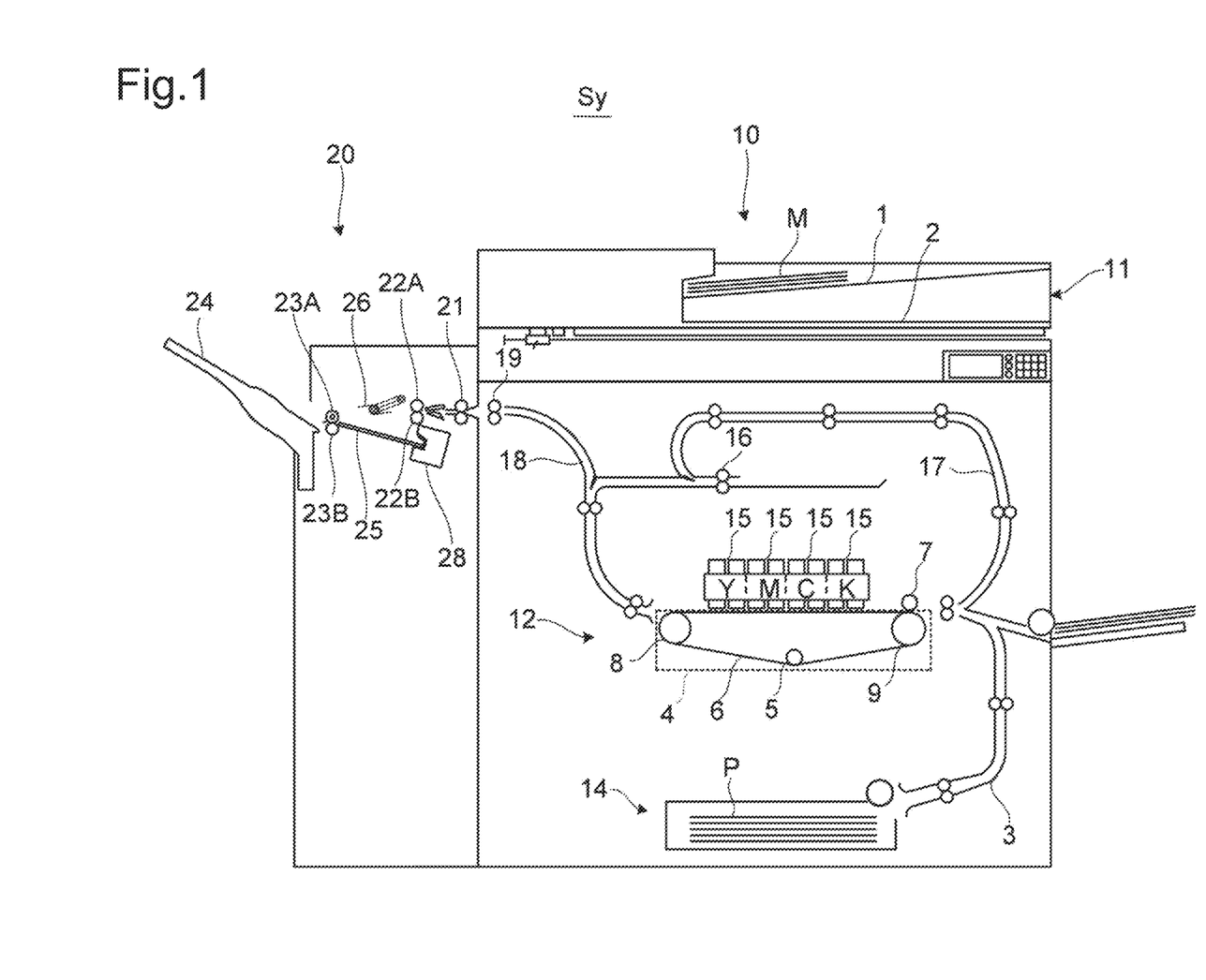
FIG. 1 is a cross-sectional view showing an image forming apparatus and a sheet postprocessing apparatus, constituting a sheet postprocessing system according to an embodiment of the disclosure.

FIG. 1 is a cross-sectional view showing an image forming apparatus 10 and the sheet postprocessing apparatus 20, constituting the sheet postprocessing system Sy according to the embodiment of the disclosure. The sheet postprocessing system Sy includes the image forming apparatus 10 that reads an image of a source document and forms the image on a recording sheet P (corresponding to the sheet in the disclosure), and the postprocessing device 20 that receives the recording sheet from the image forming apparatus 10, and performs postprocessing on the recording sheet. The sheet postprocessing apparatus 20 includes the sheet transport device according to the embodiment of the disclosure.

The image forming apparatus 10 includes an image reading device 11 and an image forming device 12. When a plurality of source documents M are placed on a document tray 1, the image reading device 11 sequentially draws out the source documents M from the document tray 1 one by one, reads the image of each of the source documents M with an image sensor, and sequentially delivers the source documents M to a discharge tray 2, so as to stack the source documents M on each other. The image reading device 11 converts the analog output from the image sensor to a digital signal, and generates image data representing the image of each of the source documents M.

The image forming device 12 forms the image of the source document M represented by the image data, on the recording sheet P through an ink jet process, each time the image data representing the image of each of the source documents M is inputted. The image forming device 12 includes line heads 15 that respectively eject ink of four colors, namely black, cyan, magenta, and yellow: The line heads 15 each eject the ink droplets of the corresponding color onto the recording sheet P, delivered to a conveying unit 4 from a sheet feeding device 14 through a first transport route 3, thereby forming a color image on the recording sheet P.

The conveying unit 4 includes a drive roller 8, a follower roller 9, a tension roller 5, and a transport belt 6. The transport belt 6 is an endless belt stretched around the drive roller 8, the follower roller 9, and the tension roller 5. The drive roller 8 is driven by a motor so as to rotate counterclockwise. When the drive roller 8 is made to rotate, the transport belt 6 revolves counterclockwise, and the follower roller 9 and the tension roller 5 are each passively made to rotate counterclockwise, by the transport belt 6.

The tension roller 5 serves to maintain the tension of the transport belt 6 at an appropriate level. The transport belt 6 is in contact with an adsorption roller 7. The adsorption roller 7 electrically charges the transport belt 6, to thereby electrostatically adsorb the recording sheet P delivered from the sheet feeding device 14, to the transport belt 6.

When the image forming device 12 forms the images of the documents M on the respective recording sheets P, the image forming apparatus 10 transports the recording sheets P to the postprocessing device 20, through a relay transport route 18 and a transport roller 19.

When the image of the source document M is also to be formed on the back face of the recording sheet P, the image forming apparatus 10 performs switchback transport, including transporting the recording sheet P from the relay transport route 18 to the transport roller 16, temporarily stopping the transport roller 16, and then reversely rotating the same. After the switchback transport is performed, the image forming apparatus 10 returns the recording sheet P to the conveying unit 4 through the second transport route 17, with the front and back faces reversed. When the image forming device 12 forms the image of the source document M on the back face of the recording sheet P, the image forming apparatus 10 transports the recording sheet P to the postprocessing device 20, through the relay transport route 18 and the transport roller 19.

Figure 2:
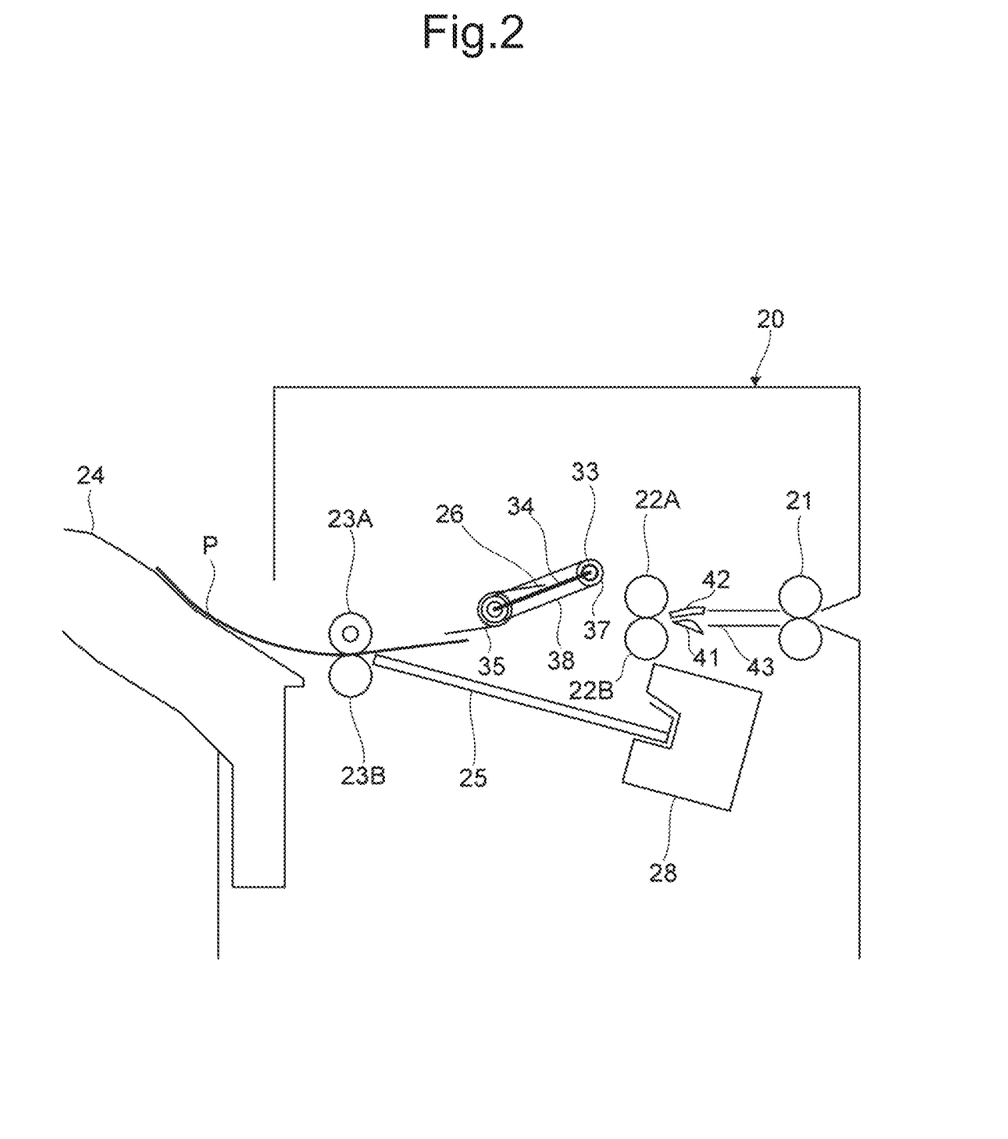
FIG. 2 is an enlarged cross-sectional view showing the sheet postprocessing apparatus.

FIG. 2 is an enlarged cross-sectional view showing the sheet postprocessing apparatus 20. As shown in FIG. 2, the sheet postprocessing apparatus 20 includes a transport roller pair 21, a transport route 43, intermediate delivery rollers 22A and 22B (corresponding to the delivery roller in the disclosure), delivery rollers 23A and 23B, an output tray 24, a processing tray 25, a paddle 26, and a stapling device 28 (exemplifying the postprocessing device in the disclosure). The transport route 43 is provided between the transport roller pair 21 and the intermediate delivery rollers 22A and 22B. The recording sheet P is transported between the mentioned rollers, along the transport route 43. The transport route 43 includes a lower guide member 41 located on the lower side, and an upper guide member 42 located on the upper side. The lower guide member 41 and the upper guide member 42 constitute a part of the transport route 43. The components in the sheet postprocessing apparatus 20, other than the delivery rollers 23A and 23B, the output tray 24, the processing tray 25, the paddle 26, and the stapling device 28, correspond to the sheet transport device according to the embodiment of the disclosure.

In the sheet postprocessing apparatus 20, the transport roller pair 21 transports the recording sheet P delivered from the image forming apparatus 10, and guides the recording sheet P to the transport route 43 having the lower guide member 41 and the upper guide member 42, thereby conducting the recording sheet P to the intermediate delivery rollers 22A and 22B. Thus, the transport route 43 is located upstream of the intermediate delivery rollers 22A and 22B in the delivery direction of the recording sheet P, and serves to conduct the recording sheet P toward the intermediate delivery rollers 22A and 22B.

In the sheet postprocessing apparatus 20, the intermediate delivery rollers 22A and 22B either transport the recording sheet P further ahead and deliver the same to the output tray 24 through the delivery rollers 23A and 23B, or deliver the recording sheet P to the processing tray 25. In the latter case, the stapling device 28 binds the end portion of a plurality of recording sheets P stacked on the processing tray 25. The sheet postprocessing apparatus 20 delivers the plurality of recording sheets P, bound by the stapling device 28, from the processing tray 25 to the output tray 24, through the delivery rollers 23A and 23B.

When the stapling operation is to be performed, the trailing edge of the recording sheet P (trailing edge of the recording sheet P in the transport direction: hereinafter simply referred to as "trailing edge") passes through the intermediate delivery rollers 22A and 22B, with the upper delivery roller 23A being spaced from the lower delivery roller 23B. Then when the leading edge of the recording sheet P (leading edge of the recording sheet P in the transport direction; hereinafter simply referred to as "leading edge")

reaches the region between the delivery rollers 23A and 23B, the trailing edge of the recording sheet P drops onto the processing tray 25.

Thereafter, a stay 34 rotates counterclockwise about a shaft 33, so that, at the same time that the paddle 26 comes closer to the processing tray 25, a second pulley 37 and an endless belt 38 rotate counterclockwise, thereby causing a first pulley 35 and the paddle 26 to rotate counterclockwise. The paddle 26 makes contact with the recording sheet P on the processing tray 25, by rotating counterclockwise, thereby biasing the recording sheet P on the processing tray 25 toward the stapling device 28, so that the trailing edge of the recording sheet P is abutted against the reference surface of the stapling device 28.

The mentioned operation is repeated thereafter, so that a plurality of recording sheets P are stacked on the processing tray 25, and the stapling device 28 binds the trailing edges of the recording sheets P stacked as above. Then the upper delivery roller 23A is brought closer to the lower delivery roller 23B and pressed thereto, so that the leading edges of the plurality of recording sheets P are pinched between the delivery rollers 23A and 23B. Then the delivery rollers 23A and 23B are made to rotate, so that the plurality of recording sheets P bound by the stapling device 28 are delivered from the processing tray 25 to the output tray 24.

The lower guide member 41 and the upper guide member 42 serve to correct the shape of the recording sheet P into a corrugated shape, in a side view from a downstream side in the transport direction of the recording sheet P (as exemplified by FIG. 6), when conducting the recording sheet P to the intermediate delivery rollers 22A and 22B, thereby enhancing the stiffness (rigidity) of the recording sheet P.

Figure 3A:
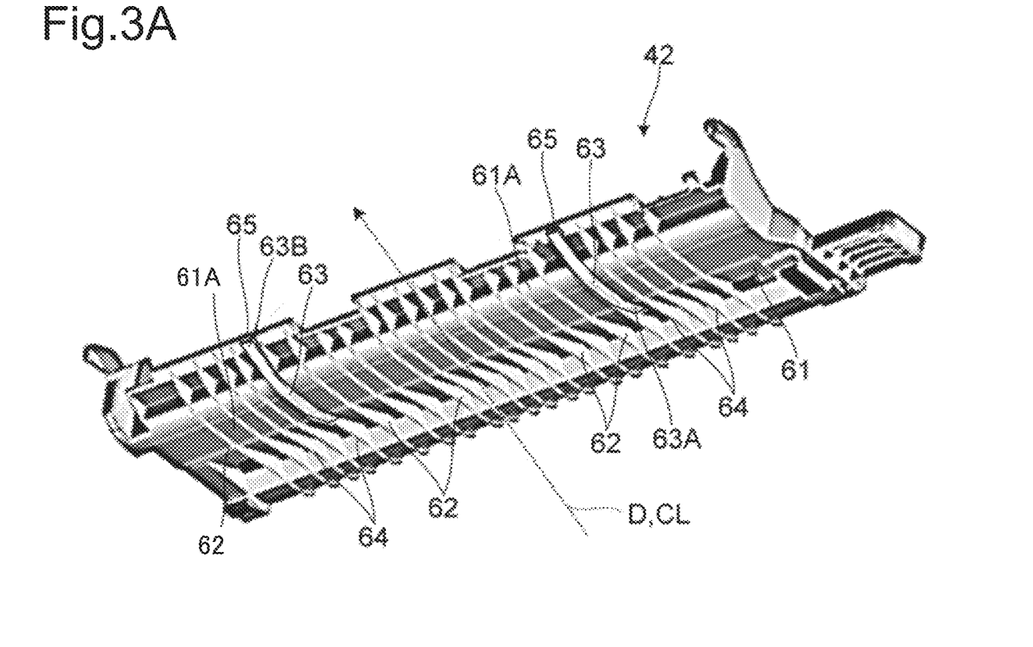
FIG. 3A is a perspective view showing an upper guide member of the sheet postprocessing apparatus, seen from an obliquely lower position on a downstream side in a transport direction of a recording sheet.
Figure 3B:
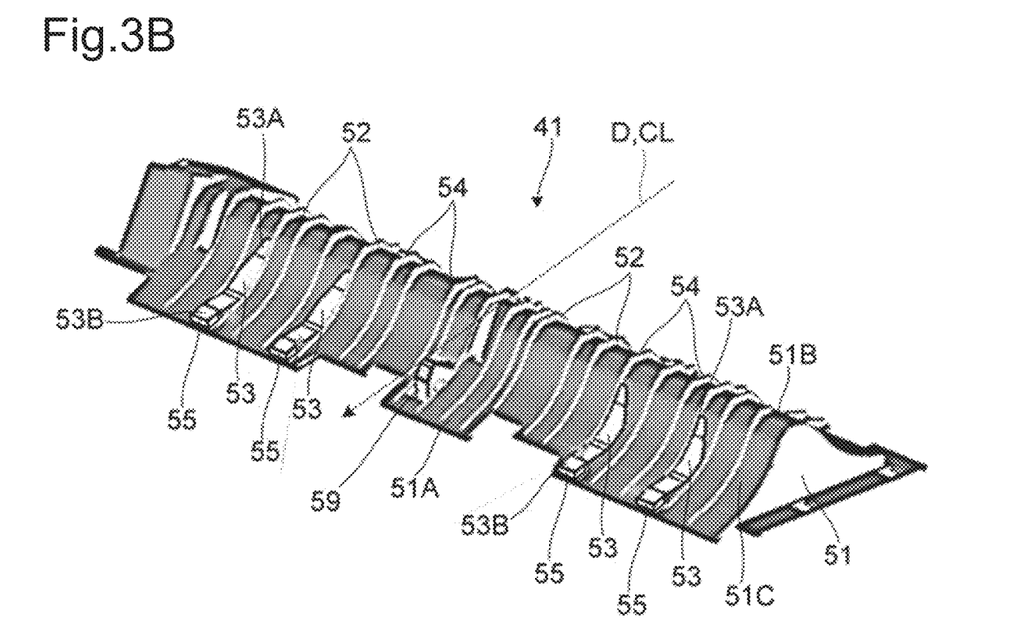
FIG. 3B is a perspective view showing a lower guide member of the sheet postprocessing apparatus, seen from an obliquely upper position on the downstream side in the transport direction of the recording sheet.

FIG. 3A is a perspective view showing the upper guide member 42, seen from an obliquely lower position on a downstream side in the transport direction of the recording sheet P. FIG. 3B is a perspective view showing the lower guide member 41, seen from an obliquely upper position on the downstream side in the transport direction of the recording sheet P.

As shown in FIG. 3B, the lower guide member 41 includes a main body 51 having a hill-shaped cross-section in a side view (seen in a horizontal direction orthogonal to the transport direction D of the recording sheet P), a plurality of ribs 52 (corresponding to the first guide ribs in the disclosure) provided on an upper surface 51A of the main body 51 with a spacing between each other, and four first corrugation members 53 located with a spacing between each other, along the width direction of the recording sheet P orthogonal to the transport direction D of the recording sheet P.

The upper surface 51A of the main body 51 includes a smoothly curved surface 51C, sloped obliquely downward from a summit 51B of the hill shape toward the intermediate delivery rollers 22A and 22B, then sloped slightly upward after forming a horizontal phase. The upper surface 51A also includes a curved surface, sloped obliquely downward from the summit 51B of the hill shape in the direction away from the intermediate delivery rollers 22A and 22B, the angle of the obliquely downward inclination being gradually gentler.

The ribs 52 are each formed so as to protrude from the upper surface 51A of the main body 51. The ribs 52 are aligned along the width direction orthogonal to the transport direction D, and each extend in the transport direction D of the recording sheet P. The ribs 52 each support the recording sheet P being transported, from the lower side.

The face of each of the ribs 52 formed along the outer edge (upper edge) thereof is curved along the upper surface 51A of the main body 51, and constitutes a part of a lower sheet supporter 54, on the lower side of the transport route 43, which guides the recording sheet P. The lower sheet supporter 54 includes a smoothly curved surface, sloped obliquely downward, then sloped slightly upward after forming a horizontal phase, along the transport route 43 toward the intermediate delivery rollers 22A and 22B in the transport direction D.

The main body 51 and the ribs 52 may be integrally formed of a synthetic resin, through a molding process.

Each of the four first corrugation members 53 is a belt-like, thin plate-shaped member, extending in the transport direction D of the recording sheet P. The first corrugation members 53 are each provided on the upper surface 51A of the main body 51 and along the rib 52, and curved along the upper surface 51A of the main body 51. The first corrugation members 53 are each located between the ribs 52 adjacent to each other in the width direction. Two each of the four first corrugation members 53 are distributed on the respective sides of a center line CL, extending in the transport direction D of the recording sheet P at the center in the width direction, and symmetrically located in the width direction, with respect to the center line CL.

An end portion 53A of each of the first corrugation member 53 (upstream side in the transport direction D) is adhered to a portion of the upper surface 51A of the main body 51 (surface sloped obliquely downward), with a double-sided adhesive tape. The surface of such end portion 53A is lower than the surface defined by the outer edge of the ribs 52 of the lower guide member 41.

The other end portion 53B of each of the first corrugation member 53 (downstream side in the transport direction D) is adhered to a portion of the upper surface 51A of the main body 51 (surface sloped slightly upward) with a double-sided adhesive tape, via the corresponding first elastic member 55 interposed therebetween. The surface of the other end portion 53B is protruding toward the upper guide member 42, to a higher position than the rib 52 and the lower sheet supporter 54.

The first corrugation members 53 are each formed of a stainless steel, for example SUS304CSP, in a thin plate shape. The first corrugation members 53 each have a thickness of 0.05±0.003 mm and Vickers hardness (HV) between 250 and 450, both ends inclusive, and water contact angle is 80° or wider.

In the main body 51 of the lower guide member 41, a swinging piece 59 is provided, which is supported so as to pivot about a shaft extending in the width direction. The swinging piece 59 is made to pivot by the pressure of the recording sheet P passing the transport route 43, upon being contacted by the recording sheet P, and retreats to inside of the main body 51 (lower side of the lower sheet supporter 54). The main body 51 includes a sensor that detects the position of the swinging piece 59 that has retreated into inside of the main body 51. A controller of the sheet postprocessing apparatus 20 decides whether the recording sheet P is passing on the transport route 43, on the basis of the detection output from the sensor. As shown in FIG. 3A, the upper guide member 42 includes a main body 61 having a cross-section, the lower side of which is recessed upward, in a side view (over the width direction, i.e., in a horizontal direction orthogonal to the transport direction D of the recording sheet P), a plurality of ribs 62 (corresponding to the second guide ribs in the disclosure) formed on the lower surface 61A of the main body 61 with a spacing between each other, and two second corrugation members 63 spaced from each other.

The lower surface 61A of the main body 61 is recessed upward, so as to cover the summit 51B of the main body 51 of the lower guide member 41, and the curved surface 51C continuous from the summit 51B.

The ribs 62 are aligned along the width direction, on the lower surface 61A of the main body 61, so as to protrude therefrom. The ribs 62 are each located with the longitudinal direction thereof oriented parallel to the transport direction D of the recording sheet P. The ribs 62 each support the recording sheet P being transported, from the upper side.

The face of each of the ribs 62 formed along the outer edge (lower edge) thereof constitutes an upper sheet supporter 64. The upper sheet supporter 64 is curved along the lower surface 61A of the main body 61, and constitutes the upper portion of the transport route 43 which guides the recording sheet P. The upper sheet supporter 64 includes a smoothly curved surface, sloped obliquely downward and then oriented generally horizontally, toward the intermediate delivery rollers 22A and 22B, in the transport direction D along the transport route 43.

The main body 61 and the ribs 62 may be integrally formed of a synthetic resin, through a molding process.

Each of the two second corrugation members 63 is a belt-like, thin plate-shaped member, extending in the transport direction D of the recording sheet P, along the ribs 62 on the lower surface 61A of the main body 61. The second corrugation members 63 are each located between the ribs 62 adjacent to each other in the width direction, and curved along the lower surface 61A of the main body 61. One each of the second corrugation members 63 is distributed on the respective sides of the center line CL, extending in the transport direction D of the recording sheet P at the center in the width direction, and symmetrically located in the width direction, with respect to the center line CL.

An end portion 63A of each of the second corrugation members 63 is adhered to a portion of the lower surface 61A of the main body 61 (surface sloped obliquely downward), opposed to the intermediate delivery rollers 22A and 22B, with a double-sided adhesive tape. The surface of such end portion 63A is lower than the surface defined by the outer edge of the ribs 62 of the upper sheet supporter 64.

The other end portion 63B of each of the second corrugation members 63 is adhered with a double-sided adhesive tape, to a portion of the upper surface 51A of the main body 51 (surface oriented generally horizontally) opposed to the intermediate delivery rollers 22A and 22B, via the corresponding second elastic member 65 interposed therebetween. The other end portion 63B is protruding toward the lower guide member 41, to a higher position than the rib 62 and the upper sheet supporter 64.

The second corrugation members 63 are, like the first corrugation members 53, each formed of a stainless steel, for example SUS304CSP, in a thin plate shape. The second corrugation members 63 each have a thickness of 0.05±0.003 mm and Vickers hardness (HV) between 250 and 450, both ends inclusive, and water contact angle is 80° or wider.

The upper guide member 42 shown in FIG. 3A is overlaid on the lower guide member 41 shown in FIG. 3B, such that the upper sheet supporters 64 of the upper guide member 42 (surface defined by the outer edge of each of the ribs 62) and the lower sheet supporters 54 of the lower guide member 41 (surface defined by the outer edge of each of the ribs 52) are slightly spaced from each other. As result, the upper sheet supporters 64 and the lower sheet supporters 54 constitute a part of the transport route 43 for the recording sheet P. The upper guide member 42 and the lower guide member 41 set as above are fixed to the frame of the sheet postprocessing apparatus 20, thus to be supported thereby.

In the mentioned state, two each of the four first corrugation members 53 are distributed to the respective sides of the center line CL extending in the transport direction D of the recording sheet P, and symmetrically located with respect to the center line CL. One each of the two second corrugation members 63 is distributed to the respective sides of the center line CL extending in the transport direction D of the recording sheet P, and symmetrically located with respect to the center line CL.

Further, one of the second corrugation members 63 is located between the two first corrugation members 53, located on one side of the center line CL of the recording sheet P in the width direction, and the other second corrugation member 63 is located between the other two first corrugation members 53, located on the other side of the center line CL of the recording sheet P. In other words, the two first corrugation members 53 and one second corrugation member 63 are alternately located in the width direction, on one side of the center line CL of the recording sheet P, and the two first corrugation members 53 and one second corrugation member 63 are alternately located in the width direction, also on the other side of the center line CL of the recording sheet P.

Figure 4A:
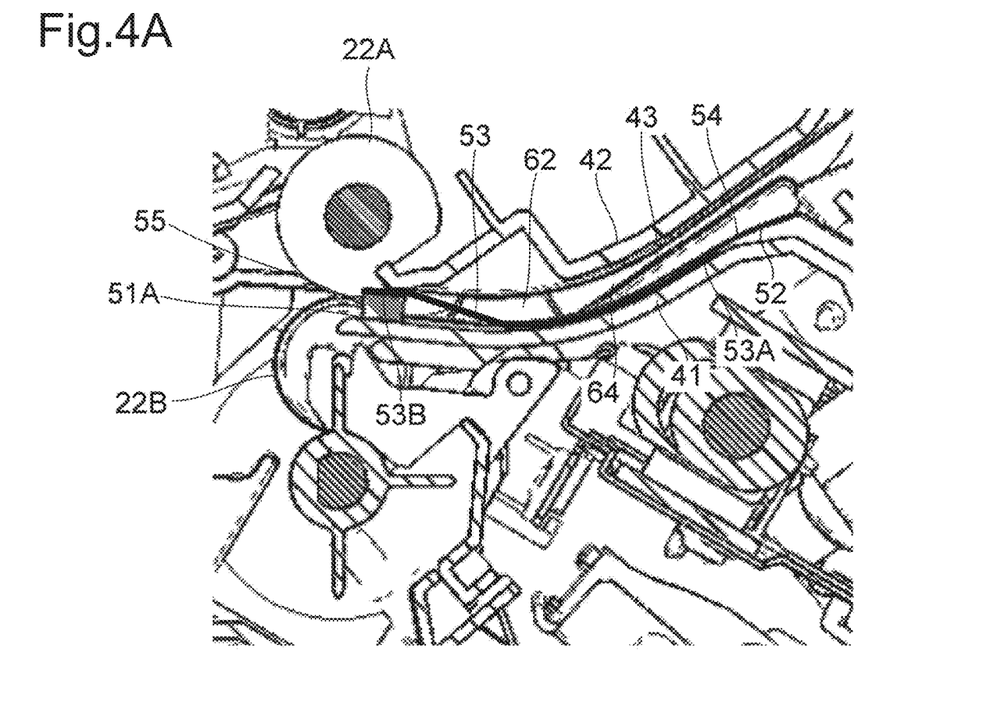
FIG. 4A is a cross-sectional view showing a first corrugation member and the proximity thereof.
Figure 4B:
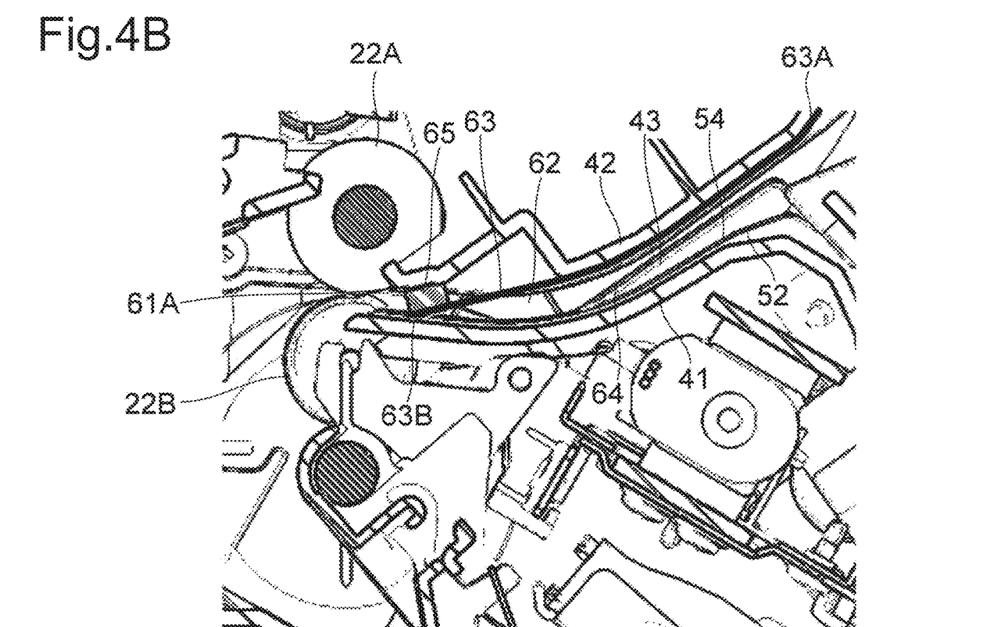
FIG. 4B is a cross-sectional view showing a second corrugation member and the proximity thereof.

FIG. 4A is a cross-sectional view showing the first corrugation member 53 and the proximity thereof. FIG. 4B is a cross-sectional view showing the second corrugation member 63 and the proximity thereof.

As is apparent from FIG. 4A, the end portion 53A of the first corrugation member 53 is adhered to the upper surface 51A (sloped obliquely downward) of the main body 51 of the lower guide member 41, and located at a lower position than the lower sheet supporter 54 (surface supporting the recording sheet P, defined by the outer edges of the ribs 52). The other end portion 53B of the first corrugation member 53 is adhered to the upper surface 51A (sloped slightly upward) of the main body 51 of the lower guide member 41, via the first elastic member 55, and protruding to a higher position than the lower sheet supporter 54. In addition, no rib 62 of the upper guide member 42 is provided on the upper side of the first corrugation member 53. Accordingly, the other end portion 53B of the first corrugation member 53 intrudes into the transport route 43 defined by the lower sheet supporter 54 and the upper sheet supporter 64, and further to the region between the ribs 62 in the width direction, so as to protrude to the upper side of the transport route 43.

As is apparent from FIG. 4B, the end portion 63A of the second corrugation member 63 is adhered to the lower surface 61A (sloped obliquely downward) of the main body 61, and located at a lower position than the upper sheet supporter 64 (surface supporting the recording sheet P, defined by the outer edges of the ribs 62). The other end portion 63B of the second corrugation member 63 is adhered to the lower surface 61A (oriented generally horizontally) of the main body 61, via the second elastic member 65, and protruding to a higher position than the upper sheet supporter 64. In addition, no rib 52 of the lower guide member 41 is provided on the lower side of the second corrugation member 63. Accordingly, the other end portion 63B of the second corrugation member 63 intrudes into the transport route 43, and further to the region between the ribs 52 in the width direction, so as to protrude to the lower side of the transport route 43.

The other end portion 53B and the first elastic member 55 of the first corrugation member 53 are protruding toward the upper guide member 42, at the position downstream of the other end portion 63B and the second elastic member 65 of the second corrugation member 63, in the transport direction D. Accordingly, it is the other end portion 53B and the first elastic member 55 of the first corrugation member 53, protruding upward on the side of the upper guide member 42, that last provide the rigidity to the recording sheet P, in the transport direction D. Therefore, the recording sheet P can be passed through the intermediate delivery rollers 22A and 22B and moved away therefrom, with the leading edge of the recording sheet P directed upward.

Figure 5A:
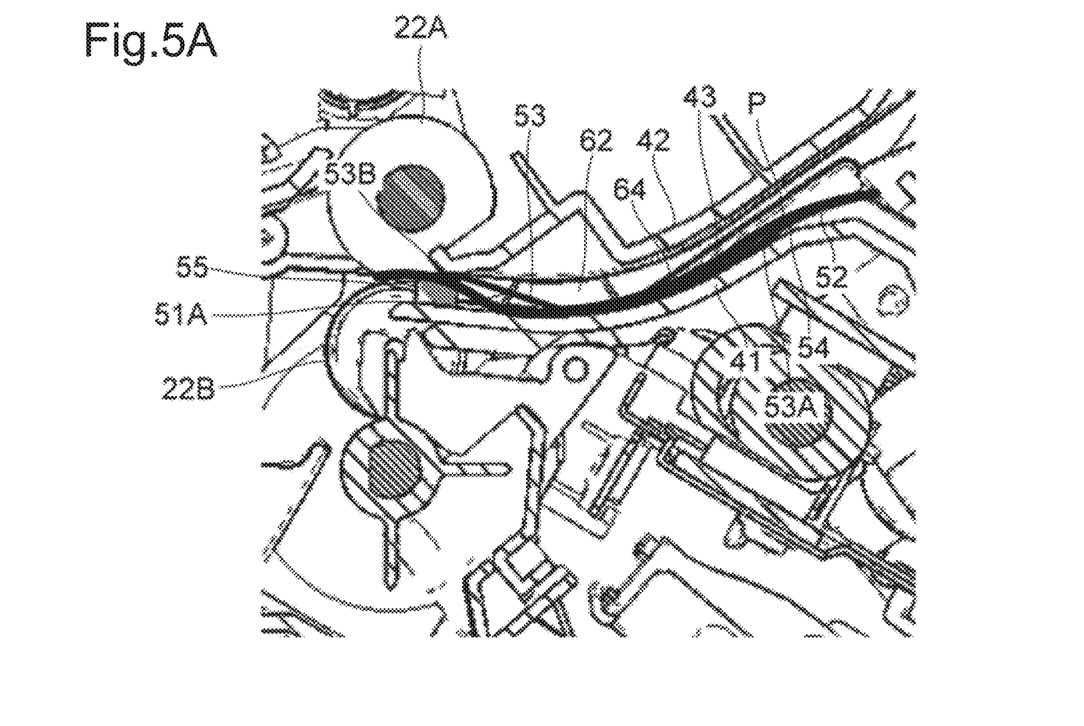
FIG. 5A is a cross-sectional view showing the recording sheet, the first corrugation member, and the proximity thereof.
Figure 5B:
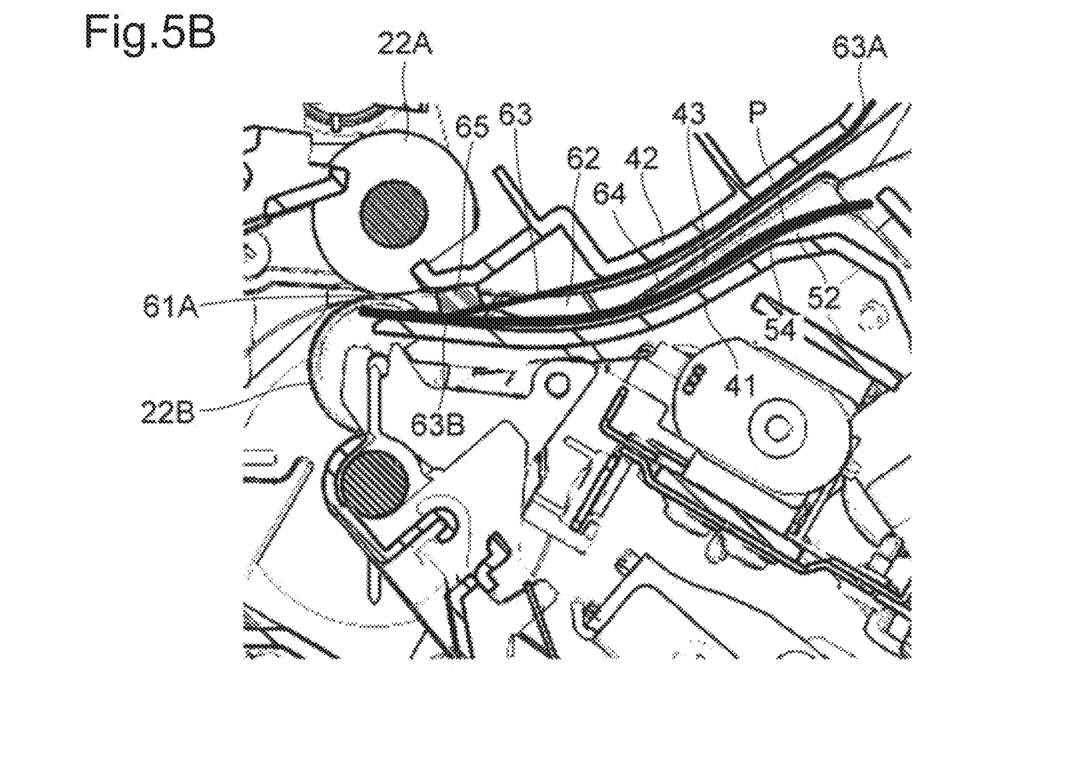
FIG. 5B is a cross-sectional view showing the recording sheet, the second corrugation member, and the proximity thereof.

FIG. 5A is a cross-sectional view showing the recording sheet P, the first corrugation member 53, and the proximity thereof. FIG. 5B is a cross-sectional view showing the recording sheet P, the second corrugation member 63, and the proximity thereof.

As shown in FIG. 5A and FIG. 5B, while the recording sheet P is being transported through the transport route 43, the other end portion 53B of the first corrugation member 53, protruding upward from inside of the transport route 43, makes sliding contact with the recording sheet P, thereby lifting up the portion of the recording sheet P in the sliding contact. At the same time, the other end portion 63B of the second corrugation member 63, protruding downward from inside of the transport route 43, makes sliding contact with the recording sheet P, thereby pressing down the portion of the recording sheet P in the sliding contact.

As described earlier, two each of the four first corrugation members 53 are distributed to the respective sides of the center line CL extending along the transport direction D of the recording sheet P, and symmetrically located with respect to the center line CL. Therefore, the respective other end portions 53B of the four first corrugation members 53 each lift up the recording sheet P, at the symmetrical positions with respect to the center line CL.

In addition, as described earlier, one each of the two second corrugation members 63 is distributed to the respective sides of the center line CL extending along the transport direction D of the recording sheet P, and symmetrically located with respect to the center line CL. Therefore, the respective other end portions 63B of the two second corrugation members 63 each press down the recording sheet P, at the symmetrical positions with respect to the center line CL.

Further, since one second corrugation member 63 is located between the two first corrugation members 53, on one side of the center line CL of the recording sheet P as described above, the recording sheet P is lifted up at the two positions on one side, and pressed down at the position between the two positions. Accordingly, a half of the recording sheet P on one side is corrected to the corrugated shape. Likewise, since one second corrugation member 63 is located between the two first corrugation members 53, on the other side of the center line CL of the recording sheet P, the recording sheet P is lifted up at the two positions on the other side, and pressed down at the position between the two positions. Accordingly, a half of the recording sheet P on the other side is corrected to the corrugated shape.

Figure 6:
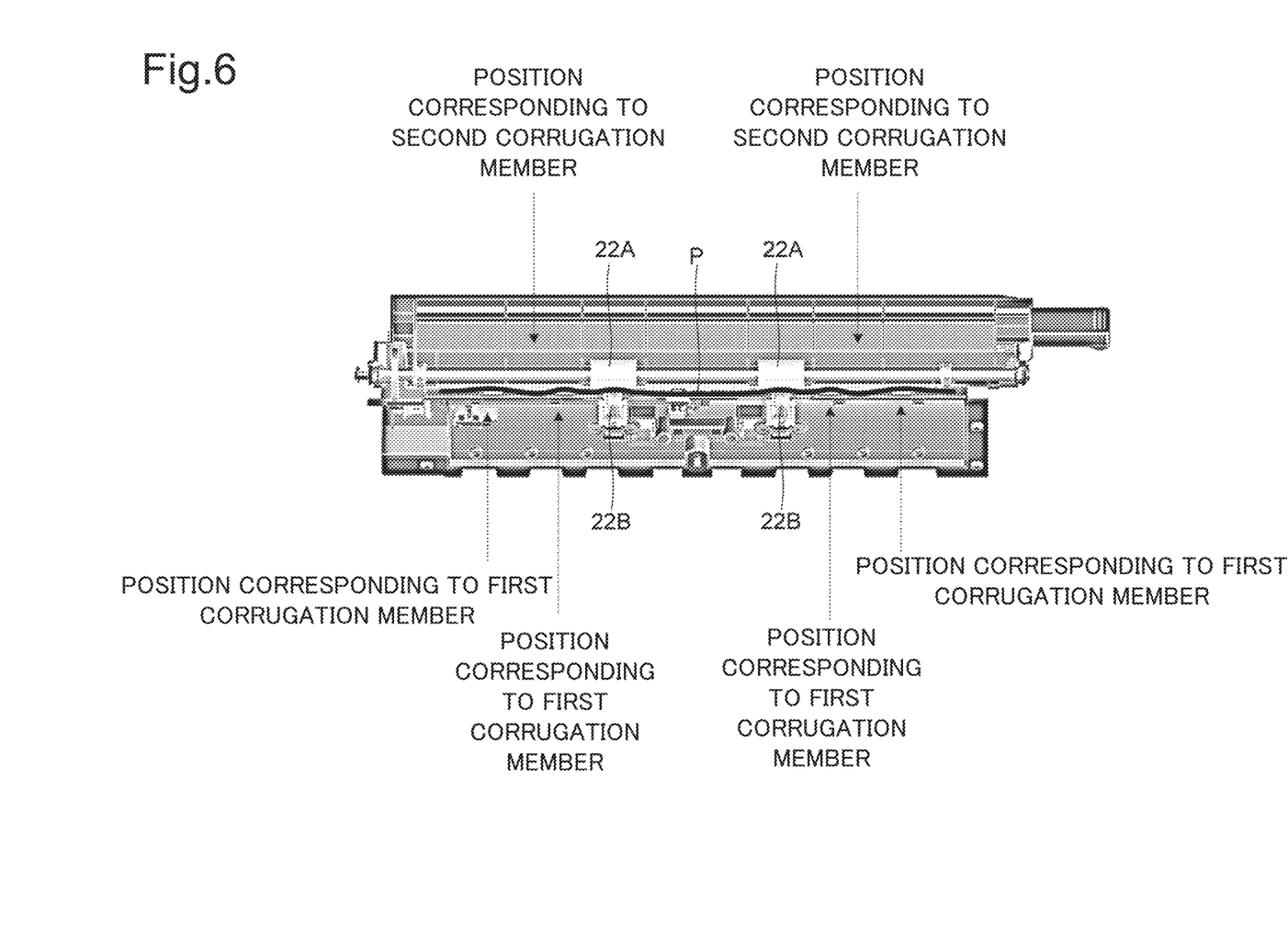
FIG. 6 is a schematic side view showing the recording sheet being delivered through a transport route, seen from the side to which the recording sheet is delivered.

FIG. 6 is a schematic side view showing the recording sheet P being delivered from the intermediate delivery rollers 22A and 22B, through the portion of the transport route 43 defined between the lower guide member 41 and the upper guide member 42, in other words defined by the lower sheet supporter 54 and the upper sheet supporter 64, seen from the side to which the recording sheet P is delivered.

As shown in FIG. 6, the recording sheet P is transported by two sets of the intermediate delivery rollers 22A and 22B, and delivered therefrom. A half of the recording sheet P on one side is lifted up at the two positions and pressed down at the position therebetween, and therefore corrected to the corrugated shape. Likewise, a half of the recording sheet P on the other side is lifted up at the two positions and pressed down at the position therebetween, and therefore corrected to the corrugated shape.

Since the image forming apparatus 10 forms the image of the source document on the recording sheet P through the ink jet process, the recording sheet P is impregnated with the ink and suffers degradation in rigidity. However, the recording sheet P corrected into the corrugated shape is newly given the enhanced rigidity, and therefore prevented from immediately drooping downward, upon being delivered from the intermediate delivery rollers 22A and 22B. In addition, the other end portions 53B the four first corrugation members 53 lift up the recording sheet P at the respective positions, and the other end portions 63B of the two second corrugation members 63 press down the recording sheet P at the respective positions. In other words, the recording sheet P is pressed from both of the upper and lower sides, and can therefore be prevented from being curled.

Further, as shown in FIG. 5A and FIG. 5B, the other end portion 53B of the first corrugation member 53 is adhered to the upper surface 51A (sloped slightly upward) of the main body 51 of the lower guide member 41, via the first elastic member 55. Accordingly, the other end portion 53B of the first corrugation member 53 serves to form a surface inclined upward, on the side of the intermediate delivery rollers 22A and 22B. In addition, since the other end portion 53B and the first elastic member 55 of the first corrugation member 53 are protruding further toward the intermediate delivery rollers 22A and 22B, with respect to the other end portion 63B and the second elastic member 65 of the second corrugation member 63, the leading edge of the recording sheet P is delivered from the sloped surface of the other end portion 53B of the first corrugation member 53.

Now; the aforementioned known delivery roller unit is configured to press the corrugation ribs against the recording sheet from above, thereby providing enhanced rigidity to the recording sheet. Likewise, the known sheet delivery device is configured to press the corrugation member against the sheet from above, thereby providing enhanced rigidity to the sheet.

However, in the case of pressing the corrugation ribs or the corrugation member against the sheet from above, the leading edge of the sheet is subjected to a downward force, when the leading edge goes out of the corrugation region. Therefore, it is difficult to allow the sheet, when the sheet is delivered through the delivery roller, to reach an advanced position (i.e., allow the leading edge of the sheet to jump ahead) in the sheet delivery direction, keeping the sheet uncurled and keeping the leading edge of the sheet from contacting the receiving surface of the output tray.

Further, when the corrugation rib or the corrugation member is pressed against the sheet only from above (only from one direction), the sheet is curled. The curl of the sheet may provoke paper jam. In addition, the end portion of the sheet that has been curled may contact the surface of the preceding sheet already placed on the output tray, thereby causing a positional shift of the preceding sheet.

In particular, when the ink jet printing is performed to form an image on the sheet, the slip resistance of the sheet surface is increased because of the ink, and therefore the resistance between the corrugation rib or the corrugation member and the sheet is also increased. As result, it may become difficult to allow the leading edge of the sheet to jump ahead, or the sheet may be curled. Since the sheet impregnated with the ink suffers loss in rigidity, more intense corrugation effect is required.

In contrast, with the arrangement according to the foregoing embodiment, when the recording sheet P is delivered from the intermediate delivery rollers 22A and 22B to the processing tray 25, the recording sheet P can reach an advanced position in the sheet delivery direction, keeping the recording sheet P uncurled and keeping the leading edge of the recording sheet P from contacting the receiving surface of the processing tray 25. In other words, the leading edge of the recording sheet P can be made to jump ahead from the intermediate delivery rollers 22A and 22B, when the recording sheet P is delivered therefrom. Thus, the recording sheet P is given the enhanced rigidity, and can be made to jump ahead from the intermediate delivery rollers 22A and 22B, without being curled. Accordingly, the recording sheet P is received by the processing tray 25 in a straightly stretched posture, which eliminates the likelihood that paper jam occurs owing to the curl of the recording sheet P, or that the preceding recording sheet P on the processing tray 25 is positionally shifted.

As described above, it is the other end portion 53B and the first elastic member 55 of the first corrugation member 53, protruding upward on the side of the upper guide member 42, that last provide the rigidity to the recording sheet P, in the transport direction D. Therefore, the recording sheet P can be passed through the intermediate delivery rollers 22A and 22B and moved away therefrom, with the leading edge of the recording sheet P directed upward, and resultantly the leading edge of the recording sheet P can be made to jump further ahead, in the delivery direction of the recording sheet P. Thus, with the arrangement according to the foregoing embodiment, the recording sheet P can attain sufficient rigidity to allow the leading edge of the recording sheet P to jump further ahead, compared with the existing device, when the recording sheet P is delivered from the intermediate delivery rollers 22A and 22B.

Further, the first corrugation members 53 and the second corrugation members 63 are each formed of a stainless steel, such as SUS304CSP, in a thin plate shape. The first corrugation members 53 and the second corrugation members 63 each have a thickness of 0.05±0.003 mm, and are made of a material having a Vickers hardness between 250) and 450, both ends inclusive. Accordingly, an increase in frictional resistance between the recording sheet P and the first and second corrugation members 53 and 63 is suppressed, despite the recording sheet P being impregnated with the ink, and therefore the leading edge of the recording sheet P can be made to jump out from the intermediate delivery rollers 22A and 22B, without being curled. In addition, the recording sheet P can be prevented from being damaged, by being contacted by the first corrugation members 53 and the second corrugation members 63.

The first corrugation members 53 and the second corrugation members 63 are formed of the stainless steel SUS304CSP, the water contact angle of which is 80° or wider. Therefore, the ink can barely stick to the surface of the first corrugation members 53 and the second corrugation members 63, which further assures that the mentioned advantageous effects can be attained.

Further, since the first corrugation members 53 and the second corrugation members 63 are formed of the stainless steel SUS304CSP, these components barely wear out, and can maintain the mentioned advantageous effects for an extended period of time.

Further, since the first corrugation members 53 and the second corrugation members 63 are each adhered with a double-sided adhesive tape, these components are removable. Therefore, the mentioned advantageous effects can be surely attained, by preparing in advance the first corrugation members 53 and the second corrugation members 63 of a plurality of sizes and shapes, and selecting the first corrugation members 53 and the second corrugation members 63 of the most appropriate size and shape, according to the material, thickness, or rigidity of the recording sheet P.

Although the image forming apparatus 10 is exemplified by the image forming apparatus based on the ink jet process in the foregoing embodiment, the disclosure is also applicable to an image forming apparatus based on electrophotography.

The configurations and processings described in the foregoing embodiment with reference to FIG. 1 to FIG. 6 are merely exemplary, and in no way intended to limit the disclosure to those configurations and processings.

While the present disclosure has been described in detail with reference to the embodiments thereof, it would be apparent to those skilled in the art the various changes and modifications may be made therein within the scope defined by the appended claims.

What is claimed is:

1. A sheet transport device comprising:
   a delivery roller that delivers a sheet; and
   a transport route provided upstream of the delivery roller in a delivery direction of the sheet, and including an upper guide member and a lower guide member opposed to each other, and configured to guide the sheet toward the delivery roller,
   wherein the lower guide member includes:
      a plurality of first guide ribs aligned on a surface of the lower guide member in a width direction orthogonal to the delivery direction, and each extending in the delivery direction, to support the sheet;
      a first corrugation member having a belt-like and thin plate shape, extending in the delivery direction along the first guide rib; and
      a first elastic member supporting an end portion of the first corrugation member, on a side of the delivery roller in the delivery direction, such that the end portion protrudes ahead of the first guide rib toward the upper guide member, with respect to the other end portion, and
   the upper guide member includes:
      a plurality of second guide ribs aligned on a surface of the upper guide member in the width direction orthogonal to the delivery direction, and each extending in the delivery direction, to support the sheet;
      a second corrugation member having a belt-like and thin plate shape, extending in the delivery direction of the sheet, along the second guide rib; and
      a second elastic member supporting an end portion of the second corrugation member, on the side of the delivery roller in the delivery direction, such that the end portion protrudes ahead of the second guide rib toward the lower guide member, with respect to the other end portion.

2. The sheet transport device according to claim 1,
   wherein a plurality of the first corrugation members and a plurality of the second corrugation members are provided, and the plurality of the first corrugation members and the plurality of the second corrugation members are alternately located, in a direction orthogonal to the delivery direction of the sheet.

3. The sheet transport device according to claim 2, wherein the plurality of the first corrugation members and the plurality of the second corrugation members are symmetrically located, with respect to a center line of the sheet in the width direction orthogonal to the delivery direction, the center line extending along the delivery direction.

4. The sheet transport device according to claim 2, wherein the end portion of the first corrugation member and the first elastic member are protruding toward the upper guide member, on a downstream side of the end portion of the second corrugation member and the second elastic member, in the delivery direction of the sheet.

5. The sheet transport device according to claim 4, wherein lower sheet supporters, defined by respective upper end portions of the plurality of the first guide ribs, each include a smoothly curved surface, sloped obliquely downward, and then upward after forming a horizontal portion, toward the delivery roller in the delivery direction.

6. The sheet transport device according to claim 1, wherein the first corrugation member and the second corrugation member are formed of a thin plate-shaped stainless steel material, having a thickness of 0.05±0.003 mm, and Vickers hardness between 250 and 450, both ends inclusive.

7. The sheet transport device according to claim 6, wherein a water contact angle of the first corrugation member and the second corrugation member is 80° or wider.

8. The sheet transport device according to claim 1, wherein the first corrugation member is removably attached to the lower guide member, and the second corrugation member is removably attached to the upper guide member.

9. A sheet postprocessing apparatus comprising:
the sheet transport device according to claim 1; and
a postprocessing device that performs postprocessing on the sheet delivered through the delivery roller of the sheet transport device.

10. The sheet postprocessing apparatus according to claim 9, further comprising a processing tray,
wherein the delivery roller of the sheet transport device delivers the sheet to the processing tray, and the postprocessing device performs the postprocessing on the sheet on the processing tray.

11. A sheet postprocessing system comprising:
an image forming apparatus including an image forming device that forms an image on the sheet; and
the sheet postprocessing apparatus according to claim 9,
wherein the transport route of the sheet transport device guides the sheet received from the image forming apparatus, to the delivery roller of the sheet transport device.

12. The sheet postprocessing system according to claim 11,
wherein the image forming device forms the image on the sheet with ink, by an ink jet printing method.

* * * * *